US011080330B2

(12) United States Patent
Suyash

(10) Patent No.: US 11,080,330 B2
(45) Date of Patent: Aug. 3, 2021

(54) GENERATION OF DIGITAL CONTENT NAVIGATION DATA

(71) Applicant: Adobe Inc., San Jose, CA (US)

(72) Inventor: Suyash, Lucknow (IN)

(73) Assignee: Adobe Inc., San Jose, CA (US)

(*) Notice: Subject to any disclaimer, the term of this patent is extended or adjusted under 35 U.S.C. 154(b) by 185 days.

(21) Appl. No.: 16/286,365

(22) Filed: Feb. 26, 2019

(65) Prior Publication Data
US 2020/0272658 A1 Aug. 27, 2020

(51) Int. Cl.
*G06T 11/20* (2006.01)
*G06F 16/64* (2019.01)
*G06N 20/00* (2019.01)
*G06F 3/0481* (2013.01)
*G06F 16/638* (2019.01)
*G06F 16/901* (2019.01)
*G06F 40/30* (2020.01)

(52) U.S. Cl.
CPC ............ *G06F 16/64* (2019.01); *G06F 3/0481* (2013.01); *G06F 16/639* (2019.01); *G06F 16/9024* (2019.01); *G06F 40/30* (2020.01); *G06N 20/00* (2019.01)

(58) Field of Classification Search
CPC .... G06F 16/64; G06F 16/639; G06F 16/9024; G06F 3/0481; G06N 20/00
USPC ...................................................... 715/700
See application file for complete search history.

(56) References Cited

U.S. PATENT DOCUMENTS

| 2006/0004703 | A1* | 1/2006 | Spivack | G06F 16/93 |
| 2011/0289520 | A1* | 11/2011 | Grigoriev | G06F 16/367 719/331 |
| 2012/0158791 | A1* | 6/2012 | Kasneci | G06F 16/9024 707/798 |
| 2018/0039907 | A1* | 2/2018 | Kraley | G06K 9/6271 |
| 2018/0349485 | A1* | 12/2018 | Carlisle | G06F 16/958 |

OTHER PUBLICATIONS

"<body>: The Document Body element", Retrieved at: https://developer.mozilla.org/en-US/docs/Web/HTML/Element/body—on Dec. 3, 2018, 24 pages.
"Angular—One framework—Mobile & desktop", Retrieved at: https://angular.io/—on Dec. 3, 2018, 3 pages.
"Breadth-first search—Wikipedia", Retrieved at: https://en.wikipedia.org/wiki/Breadth-first_search—on Dec. 3, 2018, 7 pages.

(Continued)

*Primary Examiner* — Hassan Mrabi
(74) *Attorney, Agent, or Firm* — FIG. 1 Patents

(57) ABSTRACT

Navigation data generation techniques and systems are described to address the complexities of digital content and that overcome the challenges of the conventional techniques. In one example, digital content is received by a flow graph system and used to generate a flow graph that models functionality available via the digital content as graph nodes and connections between the functions as edges between the graph nodes based on a markup language of the digital content. Each of the graph nodes includes a respective utterance that describes functionality available via that node and thus is usable to locate this functionality using semantic similarity to an input query. The flow graph is used as a basis to generate navigation data.

20 Claims, 8 Drawing Sheets

(56) References Cited

OTHER PUBLICATIONS

"Document.queryselector( )", Retrieved at: https://developer.mozilla.org/en-US/docs/Web/API/Document/querySelector—on Dec. 3, 2018, 5 pages.
"Google Text Classification Guide", Retrieved at: https://developers.google.com/machine-learning/guides/text-classification/—on Dec. 3, 2018, 3 pages.
"Hopscotch", Retrieved at: https://linkedin.github.io/hopscotch/—on Nov. 29, 2018, 10 pages.
"Intro.js—Step-by-step guide and feature introduction", Retrieved at: https://introjs.com/—on Nov. 29, 2018, 5 pages.
"Introducing JSON—How JavaScript Works by Douglas Crockford", Retrieved at: https://www.json.org/, 8 pages.
"Pearson correlation coefficient—Wikipedia", Retrieved at: https://en.wikipedia.org/wiki/Pearson_correlation_coefficient—on Dec. 3, 2018, 10 pages.
"React—A JavaScript library for building user interfaces", Retrieved at: https://reactjs.org/—on Dec. 3, 2018, 6 pages.
"Selectors—Learn Web Development", Retrieved at: https://developer.mozilla.org/en-US/docs/Learn/CSS/Introduction_to_CSS/Selectors—on Dec. 3, 2018, 4 pages.
"SemEval—2019 International Workshop on Semantic Evaluation", Retrieved at: http://alt.qcri.org/semeval2019/—on Feb. 27, 2019, 3 pages.
"STSbenchmark—Wikipedia", Retrieved at: http://ixa2.si.ehu.es/stswiki/index.php/STSbenchmark—on Dec. 3, 2018, 5 pages.
"TensorFlow Hub is a library for reusable machine learning modules", Retrieved at: https://www.tensorflow.org/hub/—on Dec. 3, 2018, 2 pages.
"TypeScript—JavaScript that scales", Retrieved at: http://www.typescriptlang.org/—on Dec. 3, 2018, 5 pages.
"Using data attributes—learn web development | mdn.", Retrieved at: https://developer.mozilla.org/en-US/docs/Learn/HTML/Howto/Use_data_attributes—on Dec. 3, 2018, 4 pages.
"Web Accessibility Initiative WAI", Retrieved at: https://www.w3.org/WAI/fundamentals/accessibility-intro/—on Dec. 3, 2018, 7 pages.
Abadi,"TensorFlow: Large-Scale Machine Learning on Heterogeneous Distributed Systems", Mar. 16, 2016, 19 pages.
Cer,"SemEval—2017 Task 1: Semantic Textual Similarity Multilingual and Cross-lingual Focused Evaluation", Jul. 31, 2017, 14 pages.
Cer,"Universal Sentence Encoder", Apr. 12, 2018, 7 pages.
Iyyer,""Deep Unordered Composition Rivals Syntactic Methods for Text Classification"", In Proceedings of the 53rd Annual Meeting of the Association for Computational Linguistics and the 7th International Joint Conference on Natural Language Processing, Jul. 2015, 11 pages.
McCann,"The Natural Language Decathlon: Multitask Learning as Question Answering", Jun. 20, 2018, 23 pages.
Peters,"Deep contextualized word representations", Mar. 22, 2018, 15 pages.
Vaswani,"Attention Is All You Need", Dec. 6, 2017, 15 pages.
Wang,"GLUE: A Multi-Task Benchmark and Analysis Platform for Natural Language Understanding", Sep. 18, 2018, 13 pages.

* cited by examiner

GENERATION OF DIGITAL CONTENT NAVIGATION DATA

BACKGROUND

Digital content continues to increase in complexity as developers attempt to differentiate themselves by adding functionality that may be of interest to users. Examples of digital content include web applications, dynamic webpages, desktop applications, and so forth that support a user interface and client-side logic for execution of functions by a processing system that are stored in a computer-readable storage medium of a computing device.

Because of this increase in the amount of functionality available via the digital content, it may be difficult for users to locate particular functionality of interest or to even become aware of this functionality. As such, this hinders user interaction with the digital content as well as decreases operational efficiency of the computing device in providing this functionality due to repeated user interactions that are often involved to achieve a desired result.

One conventional technique that has been used to address this complexity is to generate tutorials, individually, to guide users to particular functions. Conventional techniques, however, rely on the developer to manually choose functions and then also manually describe how to access these functions in order to individually create the tutorial for each function. Consequently, this may involve significant amounts of human and computing resources to accomplish, which is further exacerbated by the increase in complexity of digital content as described above involved from adding additional functions. Further, conventional techniques are static and are not able to address changes that may be made dynamically to the digital content, and thus require additional manual updates as functions are added and changed within the digital content which is further time and resource intensive.

SUMMARY

Navigation data generation techniques and systems are described to address the complexities of digital content and that overcome the challenges of the conventional techniques. These techniques as implemented by a computing device may respond automatically and without user intervention to changes in functionality made available via the digital content in real time, which is not possible using conventional techniques. Additionally, these techniques may respond dynamically to a current state in a user's interaction with the digital content, which is also not possible using conventional static techniques.

In one example, digital content is received by a flow graph system. The flow graph system is configured to generate navigation data from the digital content, automatically and without user intervention, that is usable to guide user interaction with the digital content. The flow graph models functionality available via the digital content as graph nodes and connections between the functions as edges between the graph nodes based on a markup language of the digital content. Each of the graph nodes includes at least one respective utterance that describes functionality available via that node and thus is usable to locate this functionality.

Once generated, the flow graph is leveraged by a flow graph navigation system as a basis to generate navigation data for navigation within the digital content based on an input query. An input query, for instance, is received by the flow graph navigation system from a user or other entity, e.g., as a spoken utterance converted to text, text input directly (e.g., via a keyboard), via an API, and so forth.

In response, the flow graph navigation system determines which graph node of the plurality of graph nodes has a respective utterance that has the highest probability of corresponding to the input query based on semantic similarity using natural language processing. To do so, the flow graph navigation system uses semantic similarity based on word embeddings such that a direct match is not required, but rather an intent may be determined from the input query as being semantically similar to the graph node. As a result, a direct textual match is not required but rather based on semantic similarity of the input query to the utterances.

The flow graph navigation system also detects which graph node corresponds to a current state in the execution of the digital content, i.e., "where the user is at" in the execution of the digital content. Based on the graph node that corresponds to the current state and the graph node that corresponds to the input query, the flow graph navigation system generates navigation data from the flow graph describing how to navigate from the current graph node to the graph node corresponding to the input query.

Once the navigation data is generated, the flow graph system may render this data in a user interface in a variety of ways to support a variety of functionality. In a first example, the navigation data is rendered as a tutorial to depict navigation to the graph node and corresponding functionality associated with the input query.

In a second example, the navigation data is rendered to support automation, e.g., to perform the navigation above automatically and without further user intervention after receipt of the input query. In a third example, the navigation data is rendered to increase user accessibility to the digital content and corresponding computing device, to assist and accommodate users having visual, hearing, or other impairments.

Thus, the flow graph is not fixed and as such as user interaction with the digital content occurs to add or remove content, the flow graph may be modified and persisted in real time, e.g., locally, "in the cloud," and so forth. This allows the flow graph system to generate results for queries that address the changes to the digital content as the changed occur in real time. For example, if a new playlist "ambient" is created, the flow graph system understands "save ambient offline" without reloading or re-rendering the digital content. In this way, the flow graph system may overcome the challenges of conventional techniques and support dynamic real time output, which is not possible in the conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
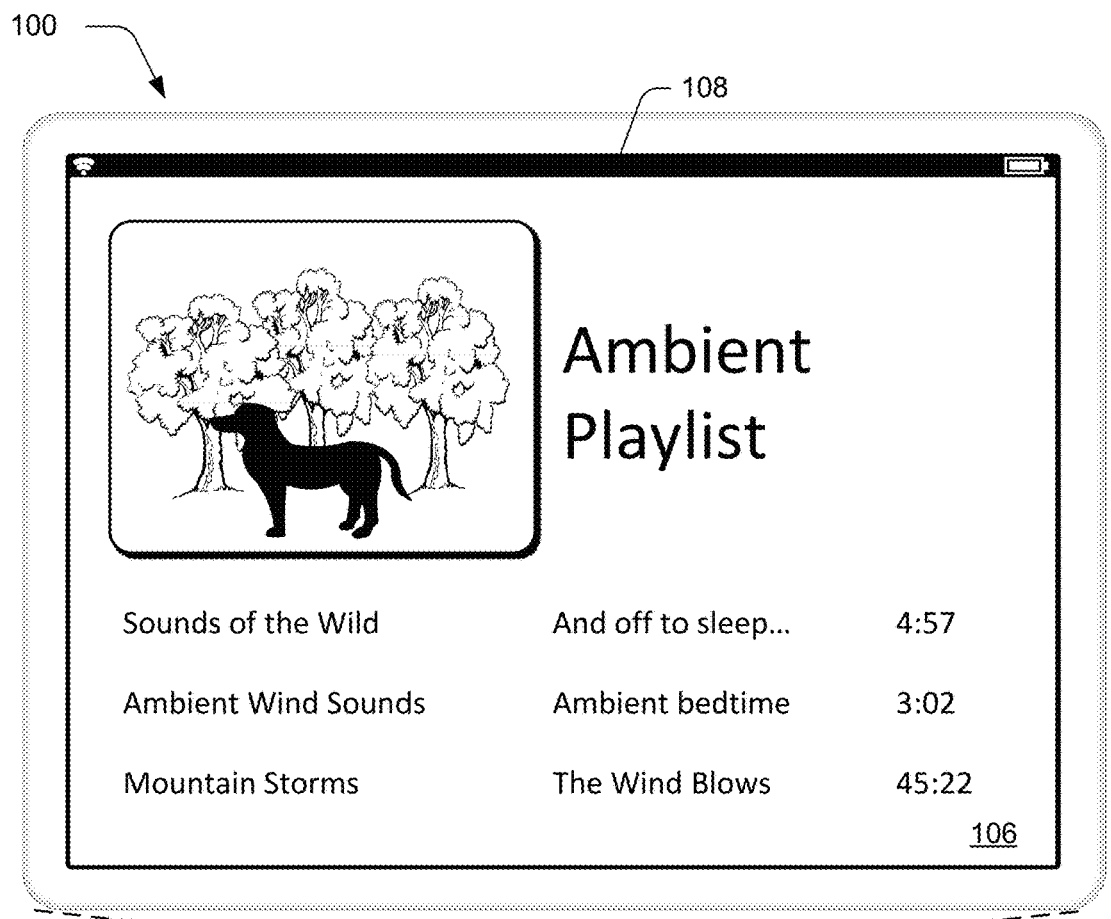
FIG. 1 is an illustration of an environment in an example implementation that is operable to employ flow graph techniques described herein.
Figure 1:
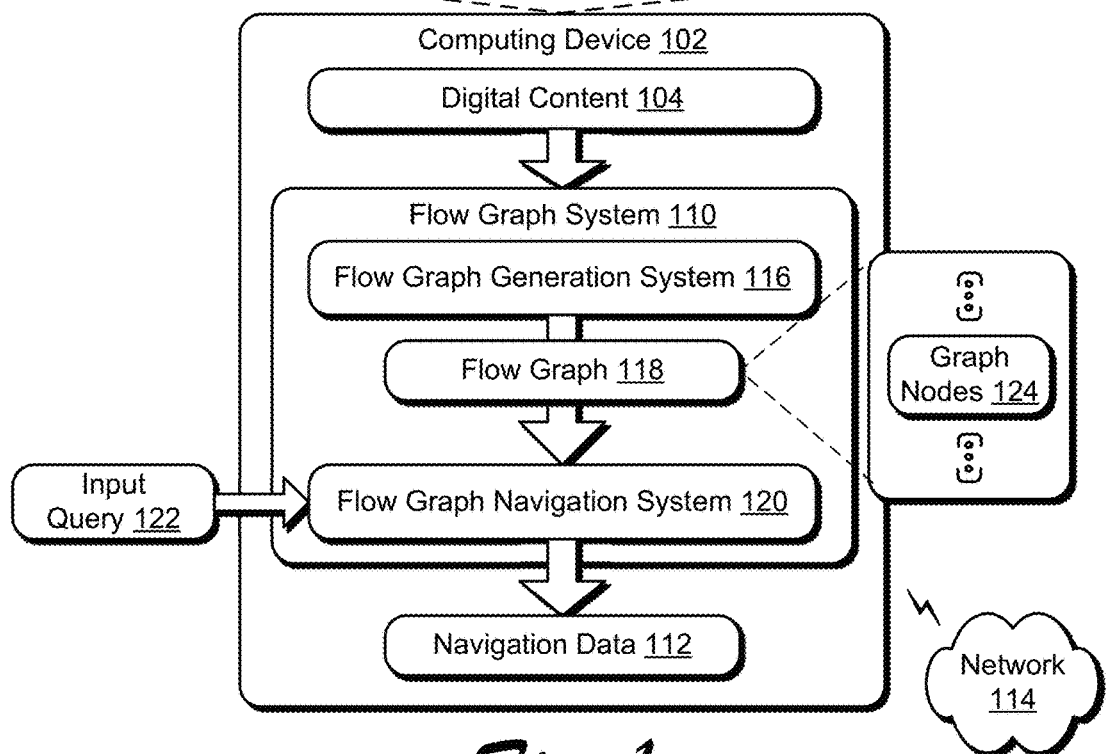

As a number of functions added to digital content continues to increase so too does the complexity in interacting with these functions. Digital content such as web applications, web pages, stand-alone desktop applications, and so forth may have a myriad of functionality that may be difficult to locate. Even in instances where this functionality is the same from one item of digital content to another, a technique used to access the functionality may vary between different items of digital content. Accordingly, this may result in user frustration and inefficient use of computational resources caused by increased amounts of navigation through the digital content to find functions of interest.

Although conventional techniques have been developed in an attempt to address these challenges, these conventional techniques are also inefficient, both computationally and with respect to user interaction. For example, a digital content designer may generate a tutorial, manually, for functions selected by the designer as being of interest. Thus, these conventional techniques rely on the designer to correctly predict which functions are of interest, and then manually generate a static tutorial for those functions. As indicated above, because the number of functions continues to increase, the designer is tasked with creating an increasingly vast number of tutorials. Further, conventional techniques are modal and often require a user to leave a context of the digital content to obtain help, e.g., to a dedicated website. Yet further, these tutorials may be static and thus not address a current execution state of the digital content, and thus are unable to dynamically address a context of a user's interaction with one function of the digital content in order to guide the user to another function.

Accordingly, navigation data generation techniques are described to address the complexities of digital content and that overcome the challenges of the conventional techniques. These techniques may respond non-modally, automatically, and without user intervention to changes in functionality made available via the digital content in real time, which is not possible using conventional techniques. Additionally, these techniques may respond dynamically to a current state in a user's interaction with the digital content, which is also not possible using conventional static techniques. Further, the navigation data generated by the techniques and systems described herein may be rendered in a variety of ways to improve efficiency of user interaction with the digital content, such as to generate tutorials, support automation, accessibility and so forth as further described below and which is also not possible using conventional techniques.

In one example, digital content configured as a web application is received by a flow graph system. A web application is typically implemented as client/server software executed by a computing device in which a user interface and client-side logic is executed within a browser or as a standalone web-enabled application, e.g., to support email, online shopping, and so forth. Other examples of digital content are also contemplated, including web pages (e.g., dynamic web pages), desktop applications executed locally by the computing device, and so forth.

The flow graph system is configured to generate navigation data from the digital content, automatically and without user intervention, that is usable to guide user interaction with the content, e.g., as a tutorial, to support automation, increase accessibility to address user disabilities, and so forth. Further, the generation of the navigation data may be performed dynamically to address changes to the digital content in real time as well as a current state in the execution of the digital content, and thus overcomes the challenges of conventional manual techniques.

To begin, the flow graph system employs a flow graph generation system to generate a flow graph which models functions available via the digital content as graph nodes and connections between the functions as edges between the graph nodes. To do so, the flow graph generation system detects a plurality of markup nodes encoded as part of a markup language of the digital content, e.g., XML, HTLM, and so forth, that are annotated as including functions that are to serve as a basis for the navigation data. A variety of functions may be implemented via the markup language by the digital content, e.g., executable operations to change brightness, fonts, navigation, rendering digital images, audio, or video, and so forth.

The flow graph system, for instance, may render a user interface that includes the markup language. Inputs are then received via the user interface to annotate markup nodes of the markup language that include functions that are desired to support navigation data, i.e., that are to serve as a basis for the navigation. This may include specifying properties such as whether a function of the markup node causes a change in state, adding utterances that are to be used to locate the functions (e.g., "save offline"), and so on.

The flow graph generation system then generates the graph nodes based on the markup nodes that are annotated. As part of this, the flow graph generation system assigns an identifier to each graph node (e.g., a unique CSS selector), a Boolean entry that defines whether the function of the graph node involves a state change (e.g., causes output of a new tab in a browser), and one or more utterances that are usable to locate the graph node as part of natural language processing as further described below. The utterances, for instance, may be used to describe the functionality available via the respective graph node. Therefore, the flow graph generation system generates the flow graph based on graph nodes that model these functions as well as edges the describe how access is achieved within the digital content between the graph nodes and corresponding functions. Other properties may also be included as part of the graph nodes (e.g., which may be added as annotations as described above), such as "text" that is output as a pop-up menu, "wait" which controls an amount of time to pause before rendering the pop-up menu, "position" which controls a position at which to render the pop-up menu, and "slots" which map to individual words for a search performed within a node, e.g., for items within a playlist in which the playlist is a graph node and the items are slots within the node. Further, the flow graph generation system is also configured to update the flow graph automatically and without intervention in response to changes detected in the digital content, and as such the flow graph may react dynamically to user interaction, e.g., to address songs added by the user to a playlist.

Once generated, the flow graph is leveraged as a basis to generate navigation data for navigation within the digital content based on an input query. The flow graph system, for instance, may include a flow graph navigation system that receives the flow graph from the flow graph generation system. An input query is then received by the flow graph navigation system from a user or other entity, e.g., as a spoken utterance converted to text, text input directly (e.g., via a keyboard), via an API, and so forth. In response, the flow graph navigation system determines which graph node of the plurality of graph nodes has a respective utterance that has the highest probability of corresponding to the input query based on semantic similarity using natural language processing.

To do so, the flow graph navigation system uses natural language understanding (a subtopic of natural language processing) such that a direct match is not required, but rather an intent may be determined from the input query as being semantically similar to the graph node. The flow graph navigation system, for instance, may employ a language model that is trained using word embeddings. The language model is configured to receive a single word or sentence for encoding, and from this produce an encoded representation of a fixed dimension, e.g., a vector of size 512, as a word embedding. The word embedding may then be used to determine a semantic similarity of the input query to utterances of the graph nodes. Semantic similarity is a metric defined between terms where a distance (i.e., amount of similarity) between them is based on the likeness of their meaning or semantic content as opposed to similarity which is estimated based on syntactical representation. As a result, a direct textual match is not required but rather based on semantic similarity of the input query to the utterances. For example, the flow graph navigation system may determine that a graph node having an utterance of "shuffle songs" corresponds to an input query of "randomly play music."

The flow graph navigation system also detects which graph node corresponds to a current state in the execution of the digital content, i.e., "where the user is at" in the execution of the digital content. When the digital content "boots up," for instance, the current state corresponds to functionality currently being rendered for view in a user interface, e.g., a loaded page of a web application. Based on the graph node that corresponds to the current state and the graph node that corresponds to the input query, the flow graph navigation system generates navigation data from the flow graph describing how to navigate from the current graph node to the graph node corresponding to the input query. The flow graph navigation system, for instance, may employ a breadth first search (BFS) technique to locate a shortest distance (e.g., path) within the flow graph between the graph nodes. BFS gives the shortest path for a graph with unweighted edges, i.e., traversing each of the edges has the same cost and different edges do not have different costs of navigation. As a result, BFS is an example of a simple algorithm to calculate a shortest path when each of the edges are unweighted, and thus gets the user to a target graph node (i.e., the graph node that corresponds to the input query) in a minimum number of steps.

Once the navigation data is generated, the flow graph system may render this data in a user interface in a variety of ways to support a variety of functionality. In a first example, the navigation data is rendered as a tutorial to depict navigation to the graph node and corresponding functionality associated with the input query. This may be performed using a series of pop-up menus having corresponding text taken from the graph nodes to show navigation from the current state to functionality of the input query.

In a second example, the navigation data is rendered to support automation, e.g., to perform the navigation above automatically and without further user intervention after receipt of the input query. In a third example, the navigation data is rendered to increase user accessibility to the digital content and corresponding computing device, to assist and accommodate users having visual, hearing, or other impairments. A variety of other examples are also contemplated. In this way, the flow graph system may overcome the challenges of conventional techniques and support dynamic real time output, which is not possible in the conventional techniques.

Term Examples

"Digital content" can take a variety of forms, one of which is a web application. A web application is typically implemented as client/server software executed by a computing device in which a user interface and client-side logic is executed within a browser or as a standalone web-enabled application, e.g., to support email, online shopping, and so forth. Other examples of digital content include web pages (e.g., dynamic web pages), desktop applications executed locally by the computing device, digital images, digital audio, digital media, and so forth.

A "flow graph" includes graph nodes that model functionality of the digital content and edges that model navigation connections between this functionality within the digital content.

A "markup language" is an annotation technique in which tags (e.g., markups) are syntactically distinguishable from content (e.g., text) of the digital content. This may be used to define presentation semantics (e.g., in HTML), procedural markups, descriptive markups, or may be generalized, e.g., XML.

"Markup nodes" define the functionality and relationship of this functionality within the digital content. For example, in HTML an entire document is a document node, and each HTML element is an element node, with text inside the HTML elements represented as text nodes and HTML attributes as attribute nodes.

"Semantic similarity" is a metric defined between terms where a distance (i.e., amount of similarity) between them is based on the likeness of their meaning or semantic content as opposed to similarity which is estimated based on syntactical representation.

"Word embedding" is a set of language modeling and feature learning techniques in natural language processing where words or phrases from a corpus are mapped to vectors of real numbers.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including digital content 104. Digital content 104 can take a variety of forms, one of which is a web application. A web application is typically implemented as client/server software executed by a computing device in which a user interface and client-side logic is executed within a browser or as a standalone web-enabled application, e.g., to support email, online shopping, and so forth. Other examples of digital content 104 include web pages (e.g., dynamic web pages), desktop applications executed locally by the computing device, digital images, digital audio, digital media, and so forth. An example of digital content 104 involving a playlist of digital audio items is illustrated as being rendered in a user interface 106 by a display device 108 of the computing device 102.

The computing device 102 also includes a flow graph system 110 that is configured to generate navigation data 112 automatically and without user intervention from the digital content 104. Although execution of the flow graph system 110 is illustrated as occurring locally at the computing device 102, the flow graph system 110 may be implemented in whole or in part "in the cloud" via a network 114 as further described in FIG. 10.

In order to generate the navigation data 112, the flow graph system 110 includes a flow graph generation system 116 that is representative of functionality to generate a flow graph 118. The flow graph system 110 also includes a flow graph navigation system 120 that is representative of functionality to generate the navigation data 112 based on an input query 122 received by the computing device 102 using the flow graph 118.

The flow graph 118 models functionality available via the digital content 104 using graph nodes 124 and edges which connect the graph nodes 124 that indicate supported navigation between the functionality within the digital content 104. The graph nodes 124 also include respective utterances that are usable to determine which graph node 124, and respective functionality, corresponds to the input query 122 based on semantic similarity.

The flow graph navigation system 120, for instance, may receive an input query 122 in a variety of ways, e.g., via a keyboard, gesture, text converted using speech-to-text functionality from a spoken utterance, via an API from another item of digital content (e.g., an application), and so forth. The flow graph navigation system 120 then employs a language model that is trained using word embeddings to determine which graph node 124 corresponds to the input query 122 using semantic similarity as part of machine learning.

In this way, an intent of the input query 122 determined by the language model may be compared to an intent of utterances included in the graph nodes 124 to determine a probability that the input query 122 corresponds to that graph node 124. The graph node 124 having the highest probability is then selected by the flow graph navigation system 120 as corresponding to the input query 122. As a result, a direct textual match is not required but rather based on semantic similarity of the input query 122 to the utterances of the graph nodes 124 as determined by the flow graph navigation system 120.

The flow graph navigation system 120 then generates navigation data 112 based on this determination of which graph node 124 corresponds to the input query 122. The flow graph navigation system 120, for instance, may determine a current state in the execution of the digital content 104 and which graph node corresponds to that state. The flow graph navigation system 120 then determines a shortest path within the flow graph 118 between these nodes and generates navigation data 112 based on this path. The navigation data 112, for instance, may render the navigation data 112 as a series of pop-up menus having text from the graph nodes 124 in the path to depict how to navigate from a current state of the digital content 104 to a graph node 124 that corresponds to the input query 122 as a tutorial. A variety of other examples are also contemplated, including support of accessibility and/or automation functionality as further described in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Flow Graph Generation

Figure 2:
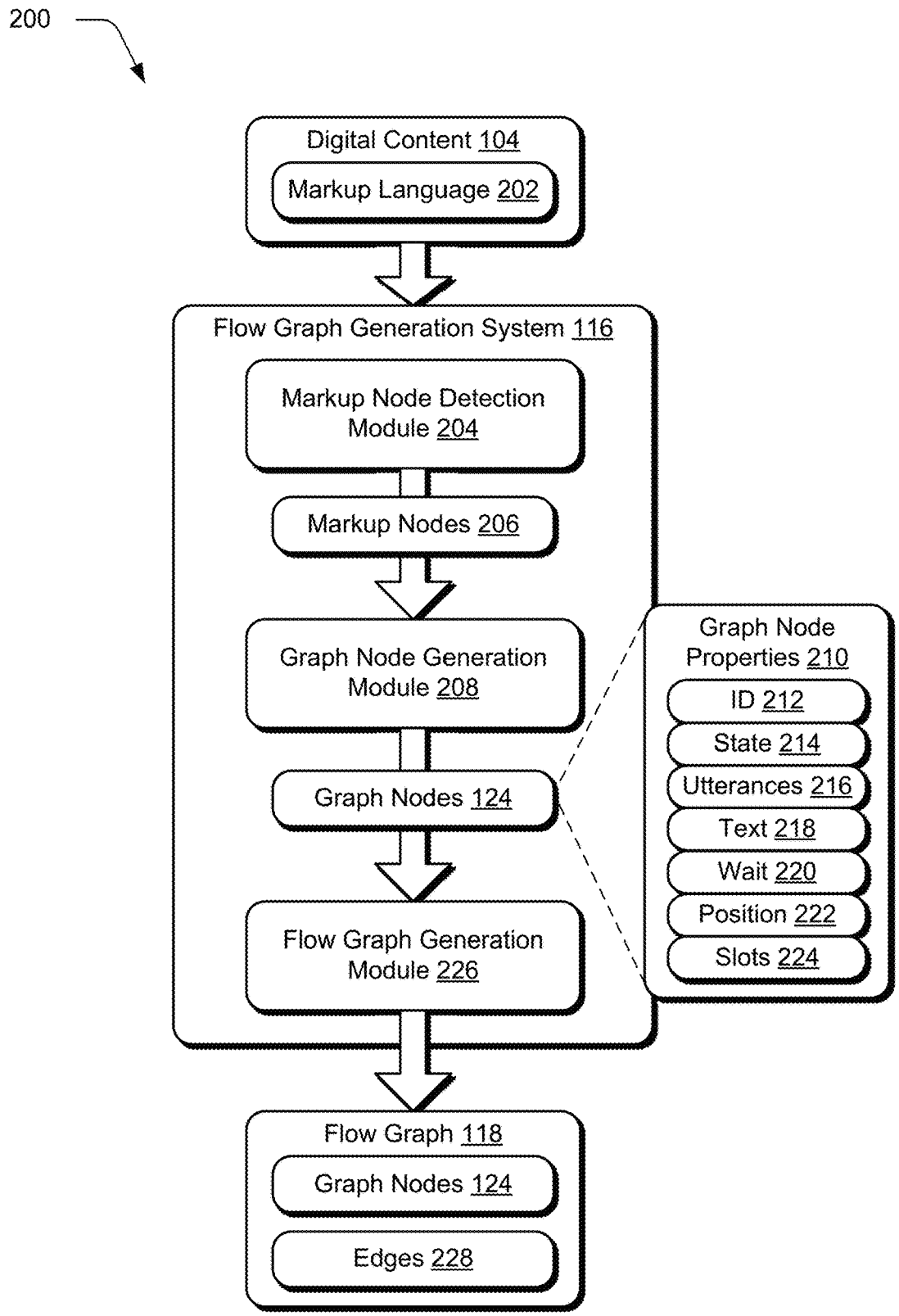
FIG. 2 depicts a system in an example implementation showing operation of a flow graph generation system of FIG. 1 in greater detail as generating a flow graph.
Figure 3:
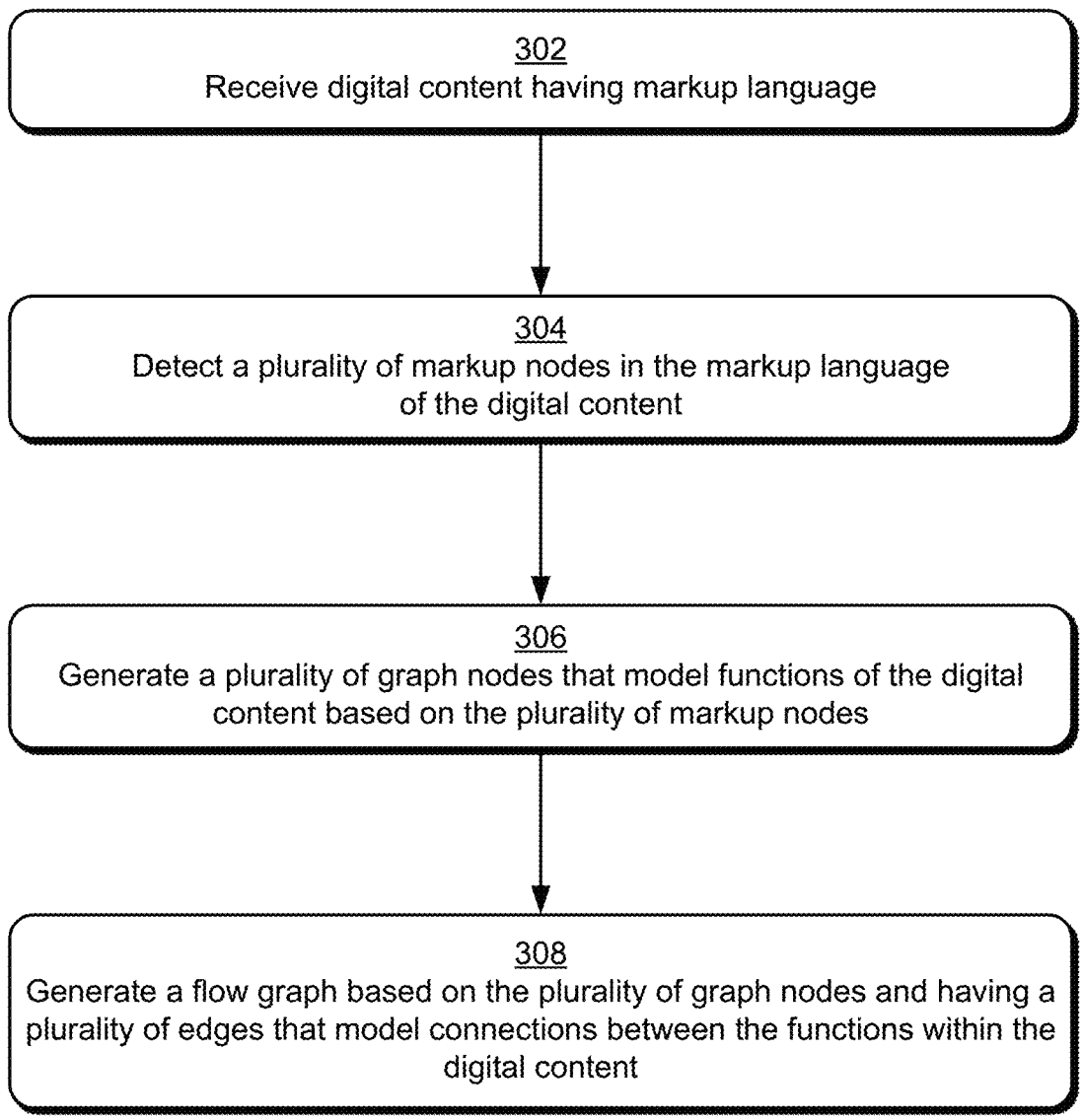
FIG. 3 is a flow diagram depicting a procedure in an example implementation in which digital content is processed by a flow graph generation system of FIG. 1 to generate a flow graph that models functions of digital content as graph nodes and includes edges that represent navigation between the functions.

FIG. 2 depicts a system 200 in an example implementation showing operation of the flow graph generation system 116 in greater detail as generating a flow graph 118. FIG. 3 depicts a procedure 300 in an example implementation in which digital content 104 is processed by a flow graph generation system to generate a flow graph that models functions of digital content 104 as graph nodes 124 and includes edges that represent navigation between the functions.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 2-3.

To begin in this example, digital content 104 is received by the flow graph generation system 116 (block 302). The digital content 104 may take a variety of forms, the illustrated example of which includes a markup language 202. A markup language 202 is an annotation technique in which tags (e.g., markups) are syntactically distinguishable from content (e.g., text) of the digital content 104. This may be used to defined presentation semantics (e.g., in HTML), procedural markups, descriptive markups, or may be generalized, e.g., XML. The markup language 202 includes markup nodes. Markup nodes define the functionality and relationship of this functionality within the digital content 104. For example, in HTML an entire document is a document node, and each HTML element is an element node, with text inside the HTML elements represented as text nodes and HTML attributes as attribute nodes.

Markup nodes 206 of the markup language 202 in this example are annotated, either through interaction with the flow graph generation system 116 and/or originally as part of creating the digital content 104. The flow graph generation system 116, for instance, may render a user interface that includes the markup language 202 of the digital content 104. Inputs are then received via the user interface to annotate particular markup nodes 206 of the markup language that include functions that are desired by a user to support generation of the navigation data 112. This may include specifying properties such as whether a function of the markup node causes a change in state, adding utterances that are to be used to locate the functions (e.g., "save offline"), and any other graph node properties 210 as further described below. In another example, these annotations are included originally as part of creating/coding the digital content 104. In this way, the flow graph generation system 116 supports a semi-automatic technique specify the markup nodes 206 that are to be used as a basis to generate the navigation data 112.

A markup node detection module 204 is then employed to detect a plurality of markup nodes 206 in the markup language 202 of the digital content 104 (block 304) as having the graph node properties 210 that are to be used as a basis to generate the navigation data based on the annotations above. The markup node detection module 204 is also used to relationships of the markup nodes 206 to each other within the digital content 104. The detected markup nodes 206 are then passed from the markup node detection module 204 to a graph node generation module 208. The graph node generation module 208 is configured to generate a plurality of graph nodes 124 that model functions of the digital content based on the plurality of markup nodes (block 306) that are detected above. The graph nodes 124, for instance, target individual markup nodes 206 of the markup language 202. An example of a graph node definition includes the following:

```
interface Slot {
  words: { [key: string] : string };
  text?: string; // defaults to "Click Me"
}
Interface Node {
```

```
  id: string;
  isState: Boolean;
  utterances: string [ ];
  text?: string; // defaults to "Click Me"
  wait?: number; //in ms, defaults to 500
  position?: "top" | "bottom" | "left" | "right"; //defaults to bottom
  slots? : {[ key: string ] : Slot };
}
```

There are a variety of graph node properties 210 that may be specified as part of generating the graph nodes 124. For example, each graph node 124 may include an ID 212 as a unique Cascading Style Sheet (CSS) selector that is used in a "querySelector" call in order to select a respective graph node 124. For example, an ID 212 for a switch element can be used to save a workload mix playlist offline can be "coral-switch[data-playlist="workload_mix"]". State 214 (e.g., "isState") is a Boolean entry that defines whether a new state is generated for the graph node 124. This is set to true for elements that are configured to make permanent changes to a current layout of the digital content 104, for example navigating to a new tab. However, for elements that do not cause any meaningful view changes (e.g., checkboxes), this value is set to false.

Utterances 216 are used to define a basis to locate respective graph nodes 124 using semantic similarity to an input query 122. Utterances 216, for instance, may include a list of sentences defining attributes of the functionality of the respective graph node 124. For an element "coral-switch [data-playlist="workload_mix"]," for instance, a list of sentences for the graph node 124 may include "saves workload mix offline", "cache workload mix," and so forth.

The graph node properties 210 may also include properties used to control rendering in a user interface. For example, the graph nodes 124 may include text 218 for a pop-up menu that is to be rendered for a respective graph node 124. Wait 220 defines an amount of time used to pause before rendering the pop-up menu, and position 222 control a position of the pop-up menu in the user interface with respect to the graph node 124.

Another property that may be defined as part of the graph nodes 124 is referred to as a dictionary called slots 224. The dictionary includes keys that are unique values for certain types of tokens, which may include "words" in a dictionary that maps individual words to a selector and is used to target an element. In an implementation, for a graph node 124 a value stored in the ID 212 is queried over an entirety of the digital content 104, whereas for a slot 224 a word mapping is queried solely within the graph node 124 in which it is contained. Therefore, elements outside of the graph node 124 cannot be queried through a slot 224 in this implementation. Slots 224 may also include a property of "text" for use as part of a pop-up menu.

In an example of a slot, consider the following graph node 124:

```
{
  "id" : "#songlist",
  "isState" : true,
  "utterances" : [
    "save {song} offline"
  ],
  "slots" : {
    "song" : {
      "words" : {
        "Yellow Submarine" : ".song[title=\"Yellow Submarine\"]",
```

-continued

```
        "Let it Be" : ".song[title=\ "Let it Be\"]"
    },
    "text" : "click to save offline"
    }
  }
}
```

In this example, the graph node 124 (i.e., "element") includes a list of songs, each of which is associated with a button to save the respective song offline, i.e., locally on a computing device. A common graph node 124 is defined for the list and individual items are matched within it. So, if the input query 122 is "how can I save Yellow Submarine offline," first, the input query is matched to the graph node 124 "# songlist" and then within that element, a pop-up menu is shown for the node corresponding to ".song [title=\"Yellow Submarine\"]." In this example, there could be other ".song[title=\"Yellow Submarine\"]" elements elsewhere in the digital content 104, but in a slot 224 the search is limited to slots 224 within that graph node 124, e.g., "# songlist".

Graph nodes 124 may be stored in a variety of ways, (1) as pure JavaScript objects in memory; or (2) as metadata in a markup language, e.g., data attributes in an HTML markup. When stored as metadata, however, if an element is rendered dynamically, then it is not possible to obtain properties and create a graph node 124 for the element without being rendered. Therefore, in instances in which digital content 104 is configured as a web application and built around a dynamic framework (e.g., React® and Angular®) each element may not be rendered unless involved in a current view and therefore the graph node 124 is maintained separately. For static digital content 104 (e.g., static websites) either approach may be used.

The graph nodes 124 are then passed from the graph node generation module 208 to a flow graph generation module 226. The flow graph generation module 226 is configured to generate the flow graph 118 based on the plurality of graph nodes 124 and that has a plurality of edges 228 that model connections between the functions within the digital content 104 (block 308). The flow graph 118, for instance, models how different interactions lead to specific functions within the digital content 104. An example of a definition for the flow graph 118 is as follows:

```
        interface Graph {
            nodes: Node[ ] ;
            edges : Array<[string, string]>;
        }
```

The flow graph 118 provides a list of graph nodes 124 and a list of edges 228, e.g., as a list of pairs of IDs with the edges being bidirectional. The flow graph 118 may be stored in a variety of ways, such as a JavaScript Object Notation (JSON) file and used to generate navigation data 112 as further described in the following section in response to receipt of an input query.

Navigation Data Generation

Figure 4:
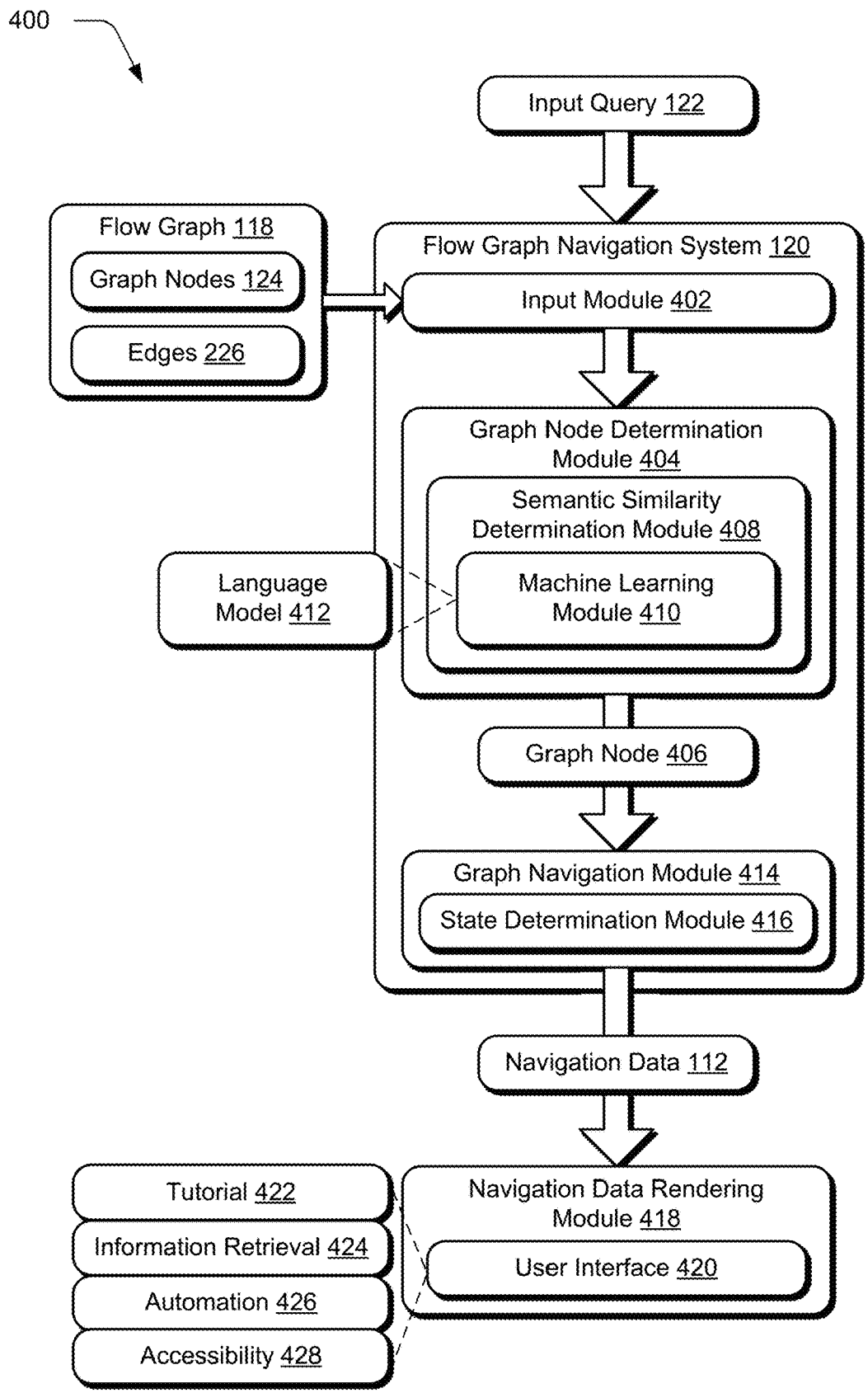
FIG. 4 depicts a system in an example implementation showing operation of a flow graph navigation system of FIG. 1 in greater detail as generating navigation data based on the flow graph of FIG. 2.
Figure 5:
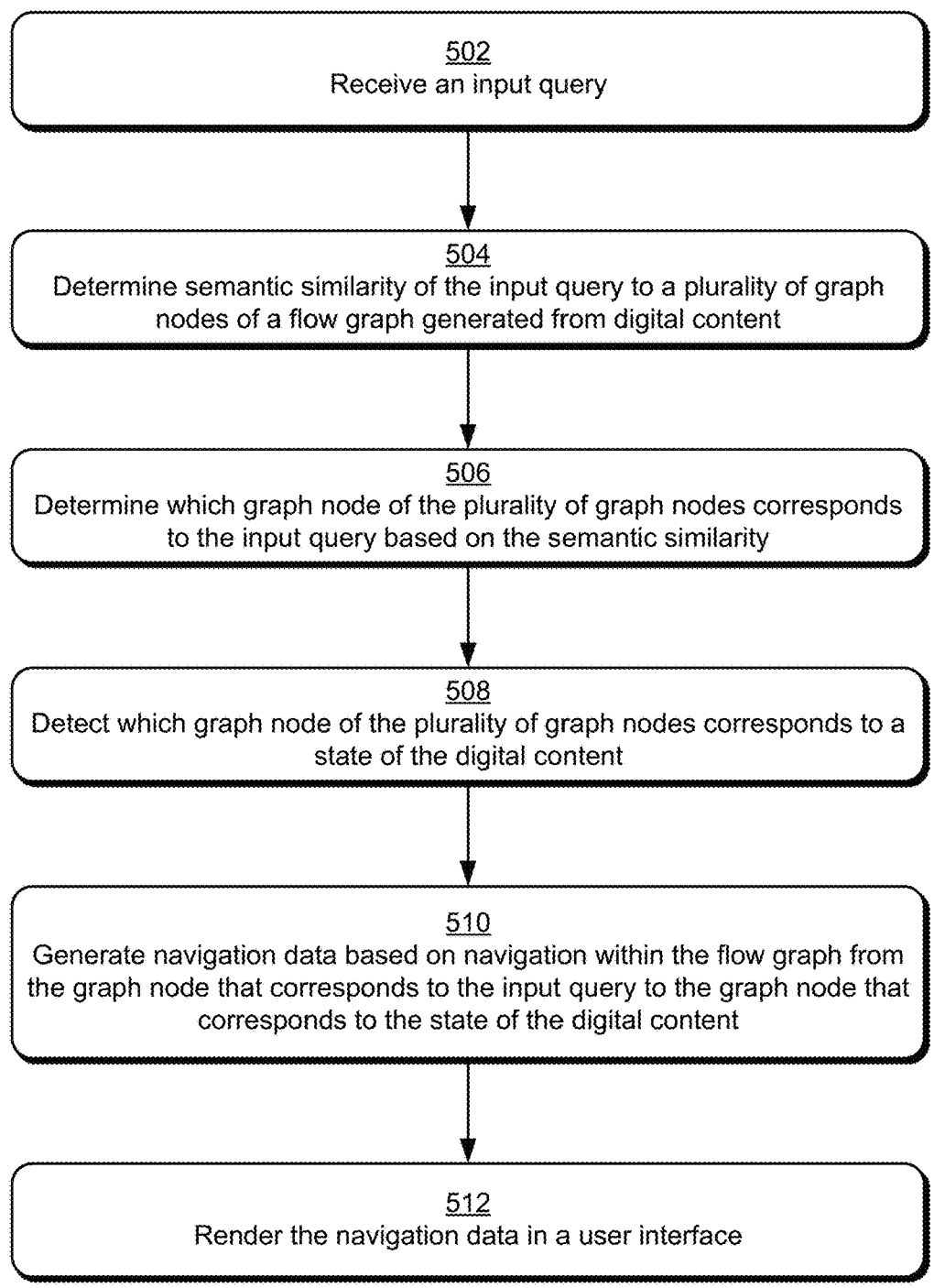
FIG. 5 is a flow diagram depicting a procedure in an example implementation in which navigation data is generated based on semantic similarity of an input query to a respect utterance of a graph node of a flow graph of FIG. 2.

FIG. 4 depicts a system 400 in an example implementation showing operation of the flow graph navigation system 120 in greater detail as generating navigation data 112. FIG. 5 depicts a procedure 500 in an example implementation in which navigation data 112 is generated based on semantic similarity of an input query 122 to a respective utterance of a graph node 124 of a flow graph 118 of FIG. 2.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 4-5.

To begin in the illustrated example, an input query 122 is received (block 502) by an input module 402 of the flow graph navigation system 120. The input query 122 may be received a variety of ways, e.g., via a keyboard, gesture, text converted using speech-to-text functionality from a spoken utterance, via an API from another item of digital content (e.g., an application), and so forth. The input module 402 also obtains the flow graph 118 having the graph nodes 124 and edges 228 from the flow graph generation system 116 of FIG. 2, e.g., from a JSON file stored in a computer-readable storage medium locally on the computing device 104 and/or remotely via a network 114 from a service provider system, e.g., a web service.

The input query 122 and flow graph 118 are then passed as an input to a graph node determination module 404. The graph node determination module 404 is configured to determine semantic similarity of the input query 122 with respect to a plurality of graph nodes 124 of the flow graph 118 generated from the digital content 104 (block 504), and more particularly semantic similarity to utterances included in those graph nodes 124. Semantic similarity is a metric defined between terms where a distance (i.e., amount of similarity) between them is based on the likeness of their meaning or semantic content as opposed to similarity which is estimated based on syntactical representation.

To do so, the graph node determination module 404 employs a semantic similarity determination module 408 having a machine learning module 410 that employs a language model 412 that is trained using word embeddings to determine which graph node 124 corresponds to the input query 122 using semantic similarity. Word embedding is a set of language modeling and feature learning techniques in natural language processing where words or phrases from a corpus are mapped to vectors of real numbers. This may be performed in a variety of ways, such as through use of a Universal Sentence Encoder that employs an encoder of a transformer and/or a deep averaging network for semantic text similarity. See Daniel Cer, Infei Yang, Sheng-yi Kong, Nan Hua, Nicole Limtiaco, Rhomni St. John, Noah Constant, Mario Guajardo-Cespedes, Steven Yuan, Chris Tar, Yun-*Hsuan Sung, Brian Strope, and Ray Kurzweil. Universal sentence encoder. CoRR*, abs/1803.11175, 2018, the entire disclosure of which is incorporated by reference.

Semantic similarity is a metric defined between terms where a distance (i.e., amount of similarity) between them is based on the likeness of their meaning or semantic content as opposed to similarity which is estimated based on syntactical representation. In an implementation, a similarity measure used to compare the input query 122 to the utterances within respective graph nodes 124 is based on angular distance between the vectors, instead of raw cosine similarity, as exhibiting increased performance:

$$sim(u, v) = \left(1 - \arccos\left(\frac{u \cdot v}{\|u\| \|v\|}\right)/\pi\right)$$

In one example, the semantic similarity determination module 408 begins by caching embeddings of utterances (i.e., word embeddings) for each of the graph nodes 124 of the flow graph 118. Then, the semantic similarity determination module 408 compares the utterances of each graph node 124, e.g., using the following TensorFlow code in Python:

```
def similarity (inp, emb):
    """
    inp: a tf.string tensor containing the input query
    emb: a [None, 512] tf.float32 tensor containing a list of
        cached embeddings
    """
    inp=embed([inp])
    input=tf.ones ((tf.shape(emb) [0], 1))*inp
    # the embeddings are normalized before cosine
    inp=tf.nn.12_noralize(inp, axis=1)
    cos=tf.reduce_sum(tf.multiply(inp, emb), axis=1)
    cos=tf.clip_by_value(cos, -1.0, 1.0)
    sims=1.0-tf.acos(cos)
    return tfreduce_max(sims)
```

Note that in the above the semantic similarity of the input query 122 with each of the utterances for a specific graph node 124 is calculated, and then the maximum probability (e.g., score) calculated for a particular utterance is used, instead of using a sum or mean. This is because the goal in this technique is to find a maximum likelihood that the input query 122 refers to a particular graph node 124, hence the maximum value is used.

In an implementation, the determination of semantic similarity for slots 224 by the semantic similarity determination module 408 differs from that above. For example, the slots 224 are expanded before caching, so from the previous example "save {song} offline" is expanded to ["save Yellow Submarine offline," "save Let it Be offline,"]. On obtaining a matching, the slot is matched exactly to a respective portion of the input query 122, and not semantically matched. Other implementations are also contemplated, however, in which semantic similarity is used.

A determination is then made by the graph node determination module 404 as to which graph node 406 of the plurality of graph nodes 124 corresponds to the input query 122 based on the semantic similarity (block 506). A threshold, for instance, may be used to indicate a minimum amount of semantic similarity, and then the graph node 406 having a highest probability (e.g., maximum score or likelihood) is selected.

The selected graph node 406 is then passed to a graph navigation module 414 to generate navigation data 112. As part of this, a state determination module 416 is employed to detect which graph node of the plurality of graph nodes 124 corresponds to a state of the digital content 104 (block 508). From this, the graph navigation module generates the navigation data 112 to dynamically address how to navigate from a current state to the graph node 406 that corresponds to the input query 122.

At initial execution of the digital content 104, for instance, there is an initial state, i.e., a node that set a current state of the digital content 104 when "booted up." In a simple example, if the digital content 104 is composed of a single page, the initial state is a graph node 124 corresponding to a "body" element. Once the graph node 124 that corresponds to the state is determined, a path is determined within the flow graph 118 between that node and the graph node 406 that corresponds to the input query 122. In one example, this is performed by determining a shortest path between these nodes within the flow graph 118 using a breadth first search (BFS), although other examples are also contemplated.

Based on this path, navigation data 112 is generated based on navigation within the flow graph 118 from the graph node 406 that corresponds to the input query 122 to the graph node that corresponds to the state of the digital content 104 (block 510) as determined by the state determination module 416. The navigation data 112 is then rendered in a user interface 420 (block 512). This may be implemented in a variety of ways, such as a tutorial 422, for information retrieval 424, automation 426, accessibility 428, and so on.

In a tutorial 422 example, the navigation data 112 is configured for output in the user interface 420 as a series of pop-menus having the text described above through use of a queue. As described above, the navigation data 112 is configured based on a path in the flow graph 118 between a graph node that corresponds to a state (e.g., current state) of the digital content 104 and the graph node 406 that corresponds to the input query 122 based on semantic similarity. Graph nodes 124 that are included in the path are sequentially added to the queue. These nodes are then output in the user interface 420 in succession as pop-up menus having respective text, positions, and wait times defined by corresponding graph node properties 210.

Figure 6:
FIGS. 6, 7, 8, and 9 depict examples of output of navigation data rendered as a tutorial in a user interface.
Figure 7:
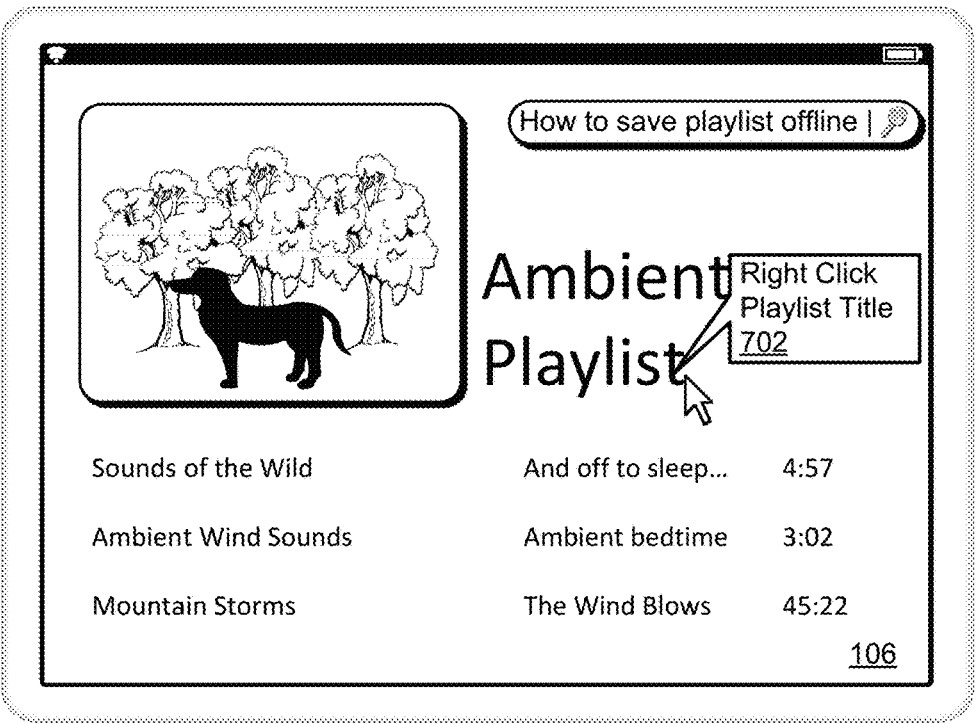

FIGS. 6, 7, 8, and 9 depict examples 600, 700, 800, 900 of output of the navigation data 112 rendered as a tutorial 422 in a user interface 106. As depicted in FIG. 6, an input query 122 is received via a search input box 602, e.g., "how to save playlist offline." In response, the flow graph navigation system 120 determines semantic similarity of the input query 122 to a graph node 406, determines which of the graph nodes 124 corresponds to a current state of the digital content 104, and generates navigation data 112 based on a path between the nodes that is stored in a queue.

Figure 8:
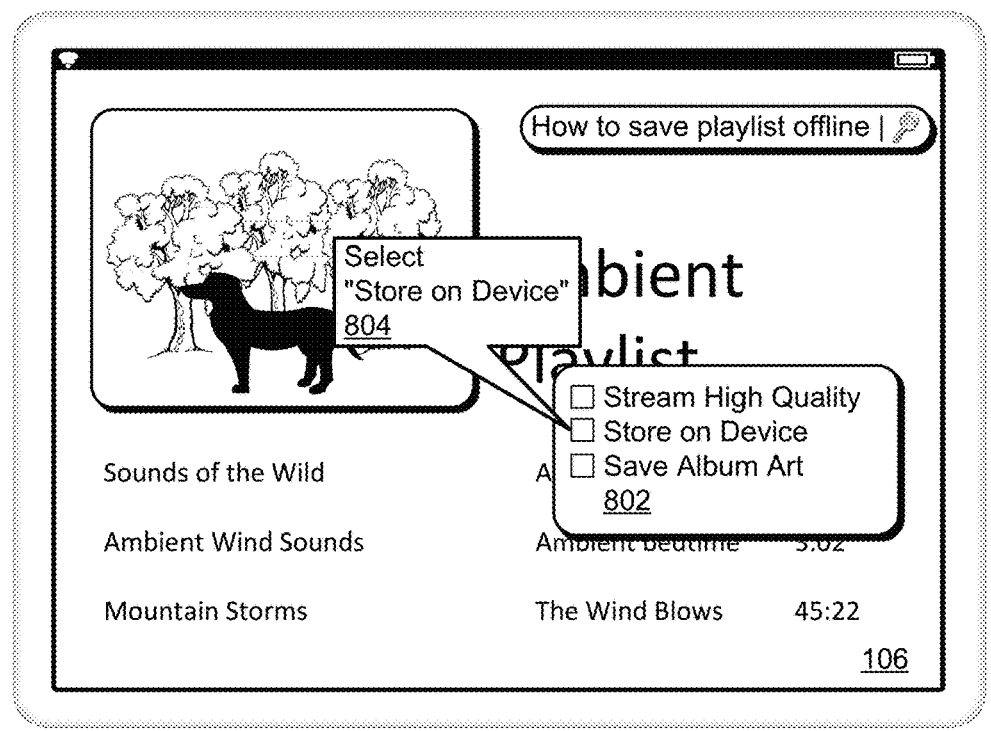
Figure 9:
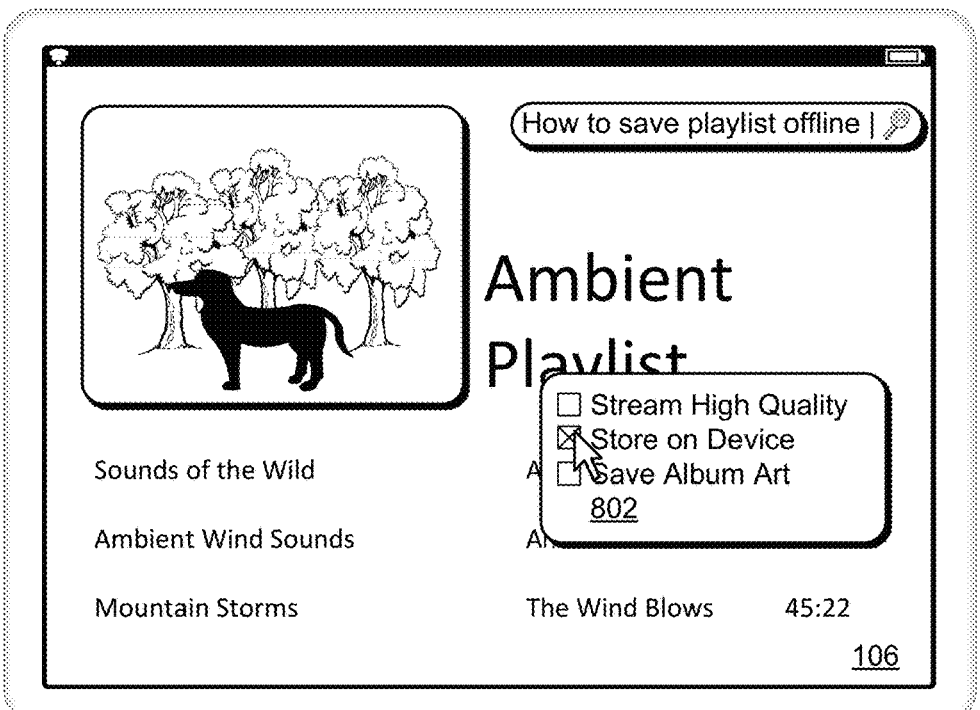

A navigation data rendering module 418 then renders the navigation data 112 in a user interface 420 as a tutorial 422 to guide the user to the desired function, e.g., to save the playlist locally. At FIG. 7, for instance, text from a next graph node in the navigation data 112 is output as a pop-up menu 702 instructing a user to "right click playlist title" at a position and wait time specified by the node. Upon receipt of a corresponding input, the navigation data rendering module 418, the graph node corresponding to the playlist title is removed from the queue and a next graph node in the queue is rendered as shown in FIG. 8. Additionally, if the graph node removed (i.e., just removed) from the queue is a state node (has isState property set to "true'), the current state node of the digital content 104 is set to the graph node that was removed from the queue. For the next input query, the shortest path in the flow graph 118 is calculated from the latest state node to the target node, i.e., the graph node that corresponds to the input query. Thus, as a user navigates across the digital content 104, if the graph node removed from the queue is a state node, the current state node of the digital content 104 is updated to that graph node. In this way, when a user enters the next input query, navigation data 112 is again generated from the user's current state with respect to the digital content 104. This updating technique may be independent of whether the graph node is removed from the queue as a part of a navigation in response to a user query, or if the user was generally browsing the digital content. As a result of updating the state, the navigation data describes a "shortest' path to the graph node that corresponds to the input query. Thus, not only does the navigation data guide the user but this is also performed in the minimum number functional steps instead of redundancies. Maintaining an up-to-date state node makes sure that the path is calculated from the application's latest state to the target node. In this example, a command menu 802 is output that corresponds to the graph node along with a pop-up menu 804 having text indicating "select 'store on device'" using a corresponding position and wait time within the user interface. Selection of this option as shown in FIG. 9 causes output of the navigation data to cease, as an object specified by the input query has been met.

As previously described, the flow graph system 110 is also capable of addressing dynamic changes to the digital content 104 in real time as these changes occur by updating the flow graph 118 using the flow graph generation system 116. Continuing with the playlist example, a template for a graph node 124 may be configured as follows:

```
{
    "id" : "coral-tab[target={playlist_id}],
    "isState" : true,
    "text" : "click to open {playlist_name}",
    "utterances" : [
        "open {playlist_name} playlist"
    ]
}
``` which can be used to create a graph node for a playlist by substituting the values of "playlist_id" and "playlist_name."

Once a graph node is generated, edges may be added for each other graph node that is to be accessible from that node. For example, a user may connect each of the existing tabs to that tab, so if the digital content 104 is in another tab, access to that tab may be supported. Once this is completed, a request may be initiated to persist the changes as part of the flow graph 118, and may do so at runtime and in real time by the flow graph system 110 and thus dynamically addresses user interaction with the digital content 104.

As described above, the navigation data may also support a variety of other functionality, including information retrieval 424, automation 426, and accessibility 428. For information retrieval 424, for instance, the information contained at a respective graph node based on semantic similarity may be surfaced directly. Likewise, for automation 426 the graph nodes may cause the navigation to be performed automatically without involving user inputs as in the tutorial 442. This also includes accessibility such as to support a framework for Accessibility Rich Internet Applications that allow a web applications and other digital content to be accessed by visually or otherwise impaired users. A variety of other examples are also contemplated.

Example System and Device

Figure 10:
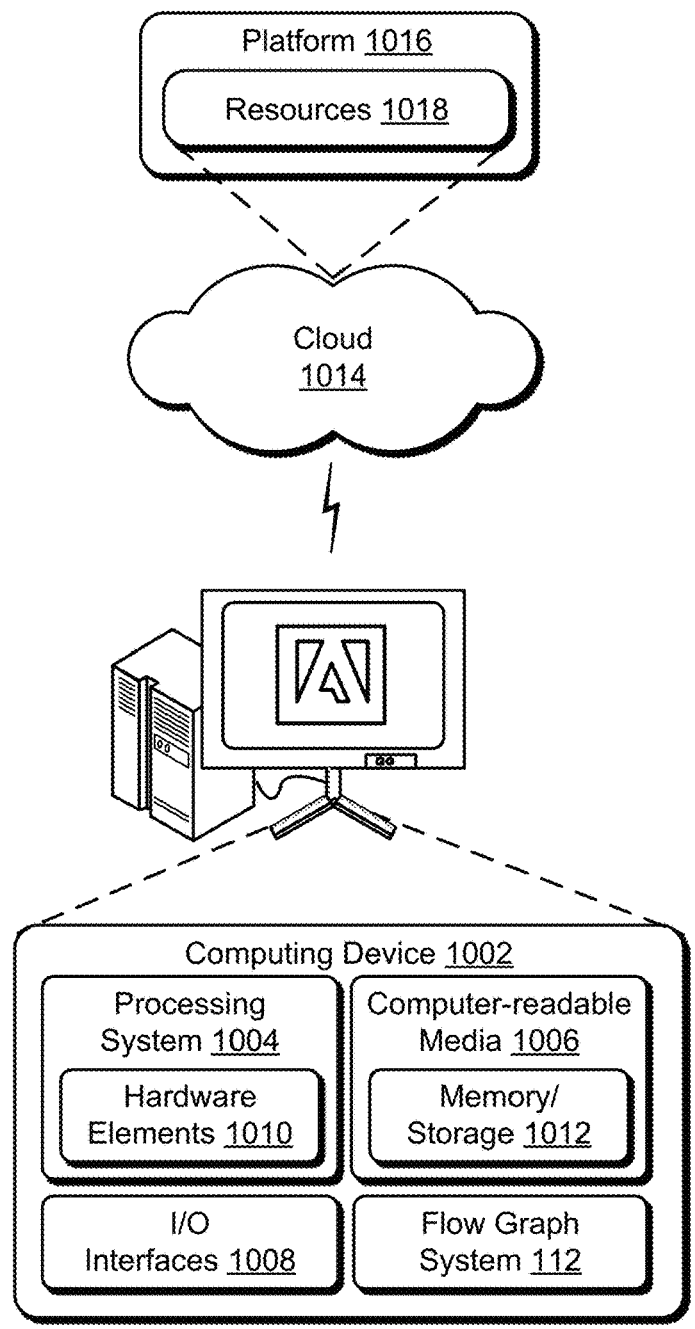
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the flow graph system 110. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
receiving, by the computing device, a flow graph generated from digital content, the flow graph including graph nodes describing functions available from the digital content and edges connecting the graph nodes that represent navigation between the functions that is supported within the digital content;
generating, by the computing device using a language model as part of machine learning, a word embedding of an input query and a plurality of word embeddings of the plurality of graph nodes;

comparing, by the computing device, the word embedding of the input query with the plurality of word embeddings of the plurality of graph nodes;

determining, by the computing device, a graph node of the plurality of graph nodes corresponds to the input query based on the comparing;

detecting, by the computing device, a graph node of the plurality of graph nodes corresponds to a state of execution of the digital content;

determining, by the computing device, a path in the flow graph between the graph node corresponding the state of execution of the digital content and the graph node corresponding to the input query; and outputting, by the computing device, the path as indicating navigation in the digital content as a series of functions corresponding to respective said graph nodes included in the path between the graph node corresponding the state of execution of the digital content and the graph node corresponding to the input query and navigation between the series of functions in the path using respective said edges in the path.

2. The method as described in claim 1, wherein the digital content is a web application and the state is a current execution state of the web application.

3. The method as described in claim 1, further comprising generating a tutorial based on the path as indicating the navigation in a user interface.

4. The method as described in claim 1, further comprising automating function navigation between the graph node corresponding the state of execution of the digital content and the graph node corresponding to the input query using the path.

5. The method as described in claim 1, further comprising detecting a change in the digital content and generating the flow graph automatically and without user intervention in real time as incorporating the change responsive to the detecting.

6. The method as described in claim 5, wherein the generating of the flow graph includes adding at least one graph node and an edge connecting the at least one graph node to a respective node of the plurality of graph nodes of the flow graph.

7. The method as described in claim 1, wherein the plurality of graph nodes include respective identifiers, Boolean entries that define state generation, and at least one utterance that acts as a basis to generate a respective word embedding of the plurality of word embeddings.

8. A system comprising:
a markup node detection module implemented at least partially in hardware of a computing device to detect a plurality of markup nodes in a markup language of a web application;

a graph node generation module implemented at least partially in hardware of the computing device to generate a plurality of graph nodes that model functions of the web application based on the plurality of markup nodes, each of the plurality of graph nodes including a respective utterance; and a flow graph generation module implemented at least partially in hardware of the computing device to:
generate a flow graph including the plurality of graph nodes and edges connecting the graph nodes that represent navigation between the functions that is supported within the web application, the flow graph supporting generation of navigation data based on a path within the flow graph defined using respective graph nodes and edges between:

a graph node of the plurality of graph nodes that corresponds to a state of the web application; and a graph node of the plurality of graph nodes that corresponds to an input query; and output the path as indicating navigation in the digital content as a series of functions corresponding to the respective graph nodes included in the path between the graph node corresponding the state of execution of the digital content and the graph node corresponding to the input query and navigation between the series of functions in the path using respective said edges in the path.

9. The system as described in claim 8, wherein the flow graph generation module is configured to generate the flow graph by generating a plurality of edges that model connections between the functions within the web application.

10. The system as described in claim 8, further comprising a graph node determination module implemented at least partially in hardware of the computing device to determine which graph node of the plurality of graph nodes corresponds to the input query by comparing a word embedding generated from the input query using a machine learning module with a plurality of word embeddings generated for the plurality of graph nodes.

11. The system as described in claim 10, wherein the graph node determination module is configured to generate the word embeddings using a language model trained as part of machine learning through natural language processing.

12. The system as described in claim 10, further comprising a graph navigation module implemented at least partially in hardware of the computing device to generate navigation data usable to guide a user through navigation of the web application based on the path.

13. The system as described in claim 12, wherein the graph navigation module is configured to generate the navigation data based on the flow graph using a breadth first search (BFS).

14. The system as described in claim 8, further comprising a navigation data rendering module implemented at least partially in hardware of the computing device to render navigation data formed from the path in a user interface.

15. The system as described in claim 14, wherein the rendering of the navigation data is included as part of outputting a tutorial in the user interface with respect to the web application.

16. The system as described in claim 14, wherein the rendering of the navigation data is included as part of automating navigation to the function of the web application that corresponding to the input query.

17. The system as described in claim 8, wherein the plurality of graph nodes include respective identifiers, Boolean entries that define generation of a new state, and at least one utterance that acts as a basis to determine the semantic similarity with respect to the input query.

18. A system comprising:
means for receiving a flow graph generated from digital content, the flow graph including graph nodes describing functions available from the digital content and edges connecting the graph nodes that represent navigation between the functions that is supported within the digital content;

means for generating a word embedding of an input query and a plurality of word embeddings of the plurality of graph nodes using a language model as part of machine learning;

means for comparing the word embedding of the input query with the plurality of word embeddings of the plurality of graph nodes;

means for determining a graph node of the plurality of graph nodes corresponds to the input query based on the comparing;

means for detecting a graph node of the plurality of graph nodes corresponds to a current state of execution of the digital content; and means for determining a path in the flow graph indicating navigation in the digital content as a series of functions corresponding to respective said graph nodes included in the path between the graph node corresponding the state of execution of the digital content and the graph node corresponding to the input query and navigation between the series of functions in the path using respective said edges in the path.

19. The system as described in claim 18, wherein the digital content is a web application and the state is a current execution state of the web application.

20. The system as described in claim 18, wherein the digital content is a markup language.

* * * * *